Figure 1:
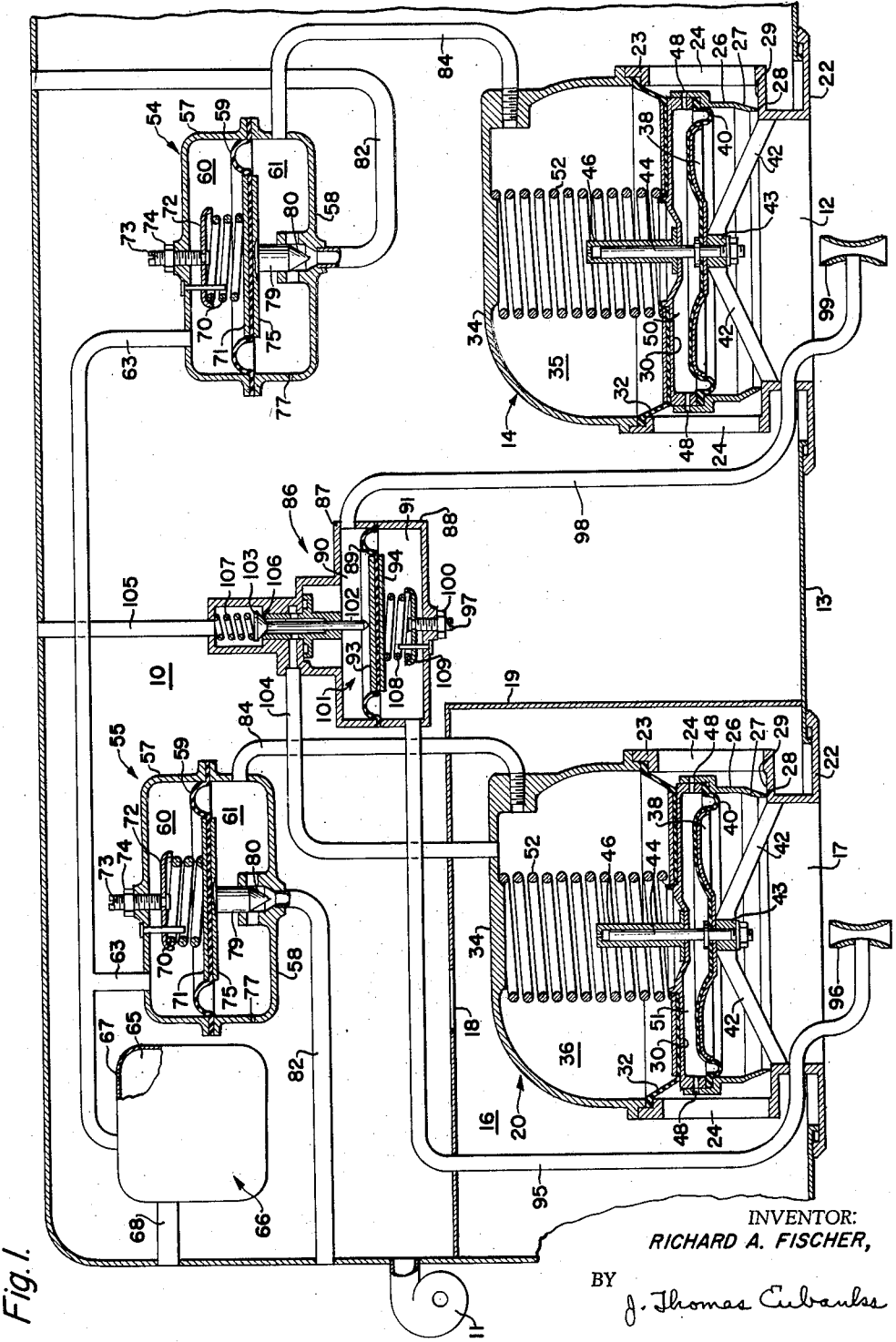

Aug. 25, 1964        R. A. FISCHER        3,145,638
          FLOW BALANCING DEVICE FOR PRESSURE CONTROL SYSTEMS
Filed Aug. 3, 1959                    2 Sheets-Sheet 1

INVENTOR:
RICHARD A. FISCHER,
BY
J. Thomas Eubanks
Attorney.

United States Patent Office 3,145,638
Patented Aug. 25, 1964

3,145,638
FLOW BALANCING DEVICE FOR PRESSURE CONTROL SYSTEMS
Richard A. Fischer, Los Angeles, Calif., assignor to The Garrett Corporation, Los Angeles, Calif., a corporation of California
Filed Aug. 3, 1959, Ser. No. 831,261
8 Claims. (Cl. 98—1.5)

This invention relates generally to pressure regulating or control systems and relates more particularly to means or mechanism for pressurizing and ventilating enclosures.

While the invention is susceptible of general application where it is desired to pressurize and ventilate an enclosure, such as therapeutic chambers, caissons, etc. and is hereinafter shown and described as embodied in such an installation, it is to be understood that its utility is not limited thereto.

Generally, when it is desired to pressurize and ventilate an enclosure, an air pump, supercharger or the like is provided for continuously supplying air under pressure to the enclosure, and the air therein is maintained at a preselected pressure by controlling the flow of air through one or a plurality of outflow valves disposed in an opening or openings in the wall of the enclosure. It is often desirable, when ventilating a pressurized enclosure having a plurality of outflow valves, to maintain equal flows through the outflow valves. However, when more than one outflow valve is utilized in a pressure control system of this type, the structural configuration of the enclosure, or the location of the outflow valves relative to the air supply ducts or to impediments in the enclosure, may cause the valves to flow very unequal amounts of air. This is especially true when one of the outflow valves controls the flow of air from the enclosure and a second outflow valve controls the flow of air from a compartment located within the enclosure, the compartment receiving its supply of air from the enclosure.

It is therefore an object of the present invention to eliminate the above described disadvantages by providing mechanism in a pressurizing and ventilating system having a plurality of outflow valves that will maintain equal flows through the outflow valves.

It is another object of the invention to provide mechanism for a system of this character wherein the mechanism modifies the operating pressure in at least one of the outflow valves to offset the effect of the pressure drop across an opening through which the air flows to one of the valves.

In some installations instead of having equal flows through the outflow valves it may be desirable or necessary to maintain a proportional flow such that one of the outflow valves will flow a greater percentage of fluid than the other outflow valve. It is therefore a further object of the invention to provide in a pressurizing and ventilating system having a plurality of outflow valves a mechanism having calibrating means for preselecting the portion of the total flow that each of the outflow valves is to handle.

It is still another object of the invention to provide mechanism of the above character wherein the mechanism is actuated in response to the fluid flowing through the outflow valves.

In prior pressurizing and ventilating systems having a plurality of outflow valves it was necessary to accurately calibrate one or more of the outflow valves to obtain the desired proportional flow through the valves. This was tedious and difficult and it is therefore an object of the present invention to provide mechanism of the above character that will maintain a preselected proportion of flow through the outflow valves without the necessity of calibrating the outflow valves.

It is still another object of the invention to provide mechanism of the above character that is relatively simple and inexpensive to construct.

Figure 2:
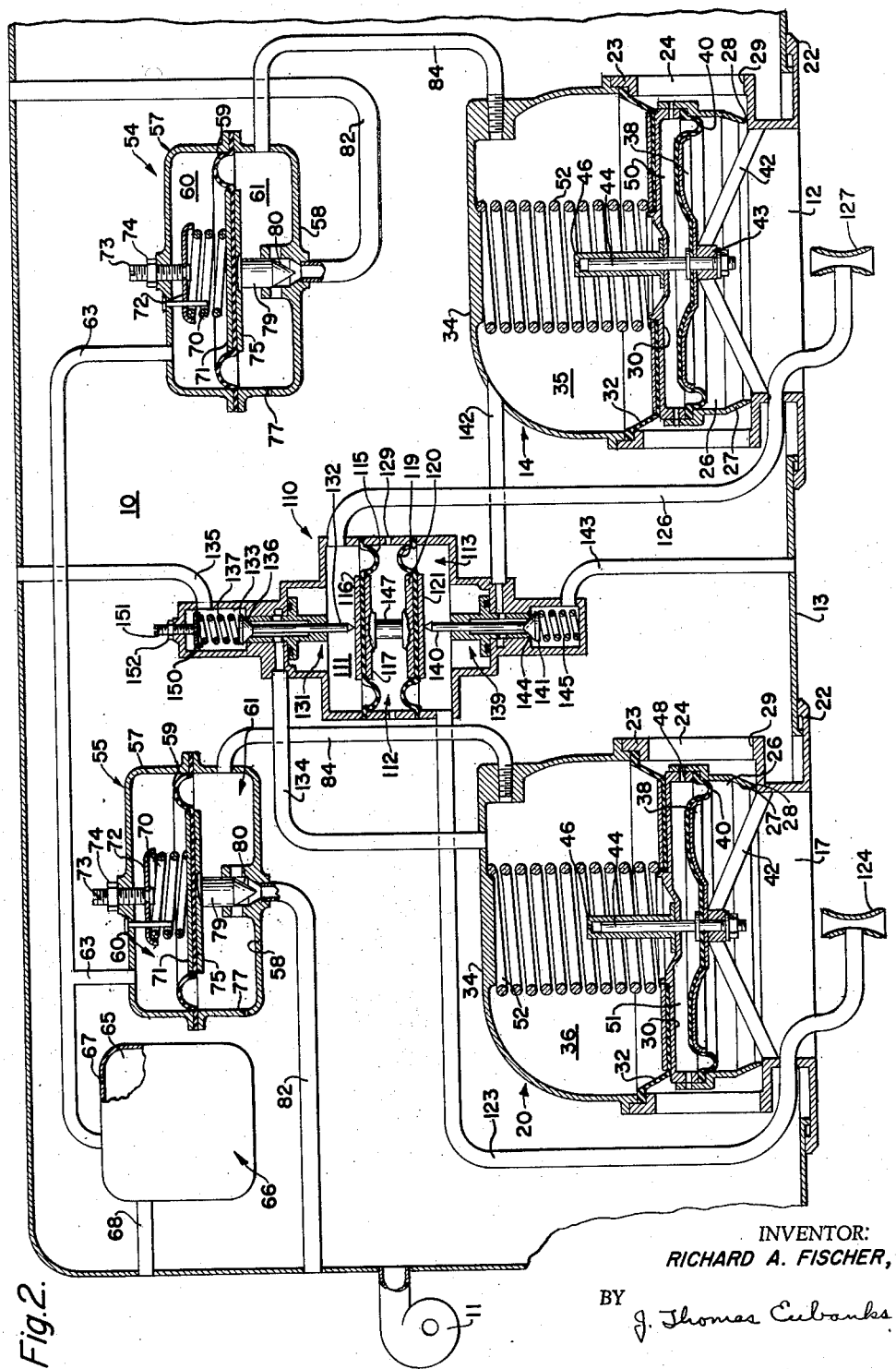

Other and further objects of the invention will become apparent from the disclosures in the following detailed specification, appended claims, and drawings, wherein:

FIG. 1 is a schematic illustration of a ventilating and pressure regulating system embodying the present invention and installed in a pressurized enclosure; and FIG. 2 is a schematic illustration of a ventilating and pressure regulating system embodying a modified form of the present invention.

Referring to FIG. 1 of the drawings, there is shown an enclosure 10 which is continuously supplied with air under pressure by means of a blower or supercharger 11 operated by any suitable source of power, not shown. The enclosure 10 communicates with a region of lower pressure, such as ambient atmosphere, through an opening 12 located in a wall 13 of the enclosure and the flow of air through the opening is controlled by an outflow valve indicated generally at 14.

Within the enclosure 10 is a compartment, indicated generally at 16, which communicates with a region of lower pressure, such as ambient atmosphere, through an opening 17 and with the enclosure 10 through an opening 18 in a partition wall 19. Flow through the opening 17 is controlled by an outflow valve indicated generally at 20. Each of the outflow valves 14 and 20 includes a base 22 having an annular wall 23 provided with a plurality of openings 24 therein. The bases of the valves are adapted to register with the openings 12 and 17 and are secured, respectively, to the walls of the enclosure and the compartment by any suitable means, not shown.

The flow of air through the openings 12 and 17 is controlled in each valve by a movable valve member 26 which is generally cylindrical in shape and has a frusto-conical portion with an inwardly tapering surface 27 and a relatively sharp edge 28 engageable with a valve seat 29. Within each of the valves there is a plate member 30 having a downturned flange to which the valve member 26 is secured. The plate member 30 is secured to a diaphragm 32 which has an outer peripheral edge portion clamped between the wall 23 and the free edge of a casing 34 to respectively define operating pressure chambers 35 and 36 in valves 14 and 20.

Within each of the valves there is a centrally disposed fixed baffle 38 of smaller diameter than the internal diameter of the valve member 26 and a diaphragm 40 connects the baffle with the valve member 26. The baffle 38 is supported by a plurality of arms 42 of a spider-like arrangement having a central hub 43. An upstanding shaft 44 fixedly secured to the hub 43 and extending axially of the valve member 26 is adapted to be received within a sleeve 46 secured to the plate member 30 to provide guide means for the valve member 26.

Openings 48 are provided through the downturned flange of the plate member 30 and the valve member 26 so that enclosure pressure prevails in the chamber 50 defined by the baffle 38, diaphragm 40, and the plate member 30 in the valve 14 while compartment pressure prevails in a chamber 51 formed between the similarly identified members in the valve 20. Thus, the side of the plate member 30 opposite the chambers 35 and 36 and the corresponding side of the diaphrgam 32 are subjected respectively to enclosure pressure and compartment pressure. The opposed surfaces or areas of the convolution of the diaphragm 40 and the tapered surface 27 are such that the forces resulting from the ambient pressure acting on these surfaces are substantially balanced.

A light spring 52 disposed about the sleeve 46 and reacting at one end against the casing 34, is secured to the plate member 30 at its other end to urge the valve member 26 in the closing direction.

The mechanism for controlling the pressure of the air in the operating pressure chambers 35 and 36 includes relay mechanisms indicated generally at 54 and 55. Each of the relay mechanisms are formed of a housing section 57 and a housing section 58 secured together with their rim projections facing each other, and clamping therebetween a flexible diaphragm 59 so as to form a chamber 60 and a chamber 61 on opposite sides of the diaphragm 59.

The chambers 60 each have a connection 63 with a control pressure chamber 65 of a control pressure setting mechanism 66 so that the pressure of the air in the chambers 60 is substantially the same as the pressure of the air in the control pressure chamber 65. The control pressure setting mechanism 66 may be of any suitable type well known in the art wherein the control pressure chamber 65 has an inlet bleed 67 from a source of higher pressure, such as the enclosure, and a connection 68 with a region of lower pressure, such as the ambient atmosphere, and the flow of air through the outlet connection 68 is controlled by the pressure control means which controls the pressure in chamber 65.

In each of the chambers 60, a calibration spring 70 is disposed between a reinforcing plate 71 and a spring retainer 72 adjustably secured to a screw 73 which extends outwardly of the housing section 57 and is secured in adjusted position by a nut 74. A reinforcing plate 75 is positioned on the side of the diaphragm 59 opposite the reinforcing plate 71 and the reinforcing plates 71 and 75 are secured to a central region of the diaphragm 59 by rivets or any other siutable and well known means, not shown.

The chambers 61 each have an inlet bleed 77 from a region of higher pressure, such as the enclosure. A metering valve member 79 is secured at its upper end to the reinforcing plate 75 and has at its lower end a head 80 which controls a connection 82 between the chamber 61 and a region of lower pressure, such as ambient atmosphere or a vacuum source. The chambers 61 of the relay mechanisms 54 and 55 are respectively joined to the operating pressure chambers 35 and 36 by conduits 84.

The control pressure setting mechanism 66 establishes a preselected reference pressure in the control pressure chamber 65 and this pressure is transmitted through the connections 63 to the chambers 60 of the relay mechanisms 54 and 55. Pressure in the chambers 60 acting on the diaphragms 59 modulates the attached metering valve members 79 to control flow of air from the chamber 61 to ambient atmosphere to establish an operating pressure in the chamber 61. The operating pressure is respectively transferred from chambers 61 through the conduits 84 to chamber 35 of the outflow valve 14 and chamber 36 of the outflow valve 20.

A flow equalizing controller is shown generally at 86 and includes a housing section 87 and a housing section 88 which are secured together by any suitable means and clamp therebetween the outer periphery of a flexible diaphragm 89 to form a chamber 90 and a chamber 91. The central region of the diaphragm 89 is clamped between a plate 93 and a plate 94 by any suitable means so that the diaphragm and the plates form a differential pressure responsive movable wall. A tube 95 connects the chamber 91 with the throat of a Venturi 96 located within the base 22 of the outflow valve 20. Similarly a tube 98 connects the chamber 90 with the throat of a Venturi 99 located within the base 22 of the outflow valve 14. Thus the pressures in chambers 90 and 91 are respectively the pressures sensed at the throat of the Venturis 99 and 96, the pressures being a measure of the air flowing through the outflow valves 14 and 20. It is to be understood that the air flowing through the outflow valves may be sensed in other ways, the method shown in the drawing being only by way of example.

A metering valve member 101 comprising a stem 102 and a head 103 is positioned within the controller 86 to control flow of air through conduits 104 and 105 connecting the operating pressure chamber 36 of the outflow valve 20 with ambient atmosphere. The head 103 and the stem 102 of the valve member 101 are respectively urged toward a valve seat 106 and into engagement with the reinforcing plate 93 by a spring 107.

A calibration spring 108 is disposed between the plate 94 and a spring retainer 109 secured to an adjusting screw 97 which extends outwardly of the housing section 88 and is secured in adjusted position by a nut 100. As hereinafter described, the force of the spring 108 may be adjusted by means of the screw 97 to obtain any desired proportional flow through the outflow valves.

The spring 107 and the pressure of the air in chamber 90 exert a force on one side of the diaphragm 89 which is opposed by the force of the spring 108 and the pressure of the air acting on the other side of the diaphragm. When it is desired to maintain equal flows through the outflow valves 14 and 20, the force of the spring 108 is adjusted so that the metering valve member 101 will be in a modulating position when the pressures of the fluid in chambers 90 and 91 are equal. If the pressure of the fluid in chamber 91 exceeds the pressure of the fluid in chamber 90, the diaphragm 89 and the metering valve 101 is moved in the upwardly direction to move the valve head 103 further off the valve seat 106 to permit additional fluid to flow from the operating pressure chamber 36 through conduits 104 and 105 to ambient atmosphere. Thus pressure in chamber 36 is lowered and the outflow valve 20 is moved in the opening direction to equalize the flow through the two valves. Conversely if the pressure of the fluid in chamber 90 exceeds the pressure of the fluid in chamber 91 the diaphragm 89 and the metering valve 101 is moved in the downwardly direction to move the valve head 103 toward the valve seat 106 to restrict the flow of fluid from the operating chamber 36 of the outflow valve 20 through conduits 104 and 105 to ambient atmosphere to permit the valve 20 to move toward the closed position to equalize the flow through the two valves.

In operation, air pumped by the supercharger 11 flows through the enclosure 10 and the compartment 16 to the outflow valves 14 and 20. Simultaneously a selected reference pressure is established in the control pressure setting mechanism 66 and transmitted through connections 63 to the relay mechanisms 54 and 55 which function to provide the operating pressure for chambers 35 and 36 of the outflow valves 14 and 20.

In the form of the invention shown in FIG. 1, the pressure in compartment 16 tends to be lower than the pressure in the enclosure 10 due to the pressure drop across the restriction, or opening 18. In normal operation, therefore, the outflow valves tend to flow unequal amounts of air, the outflow valve 14 flowing a larger amount of air than the valve 20. The unequal flows through the Venturis 96 and 99 create unequal pressures in the tubes 95 and 98, the pressure in the tube 95 exceeding the pressure in the tube 98. With the controller 86 set to maintain equal flows through the outflow valves the resulting unequal pressures in chambers 91 and 90 create a pressure differential across the diaphragm 89 which tends to force the diaphragm 89 and the metering valve member 101 in the upwardly direction to move the head 103 further off the seat 106 and permit additional fluid to flow from the chamber 36 through the conduits 104 and 105 to ambient atmosphere. Decreasing the pressure in the chamber 36 increases the pressure differential across the diaphragm 32 to move the outflow valve 20 in the opening direction to increase the flow through the outflow valve 20. When the flow through the outflow valve 20 equals the flow through the outflow valve 14 the tubes 95 and 98 transmit equal pressures to the chambers 91 and 90 on opposite sides of the diaphragm 89 and the valve head 103 assumes a modulating position to maintain equal flows through the outflow valves.

It is to be noted that the flow equalizing controller 86 is responsive to, and is actuated by, the flow through the two outflow valves. The individual outflow valves therefore need not be calibrated to obtain the desired proportional flow.

It is to be further noted that increasing or decreasing the force of the spring 108 above or below the above described adjustment for maintaining equal flows through the outflow valves will cause the valves to flow unequal amounts of air, the proportion of air flow through each valve being determined by the setting of the adjustment screw 97. Thus if the force of the spring 108 is increased the diaphragm 89 and the metering valve member 101 will be moved in the upwardly direction thus moving the head 103 further off the seat 106. To move the valve member 101 in the downwardly direction into modulating position to maintain a proportional flow through the outflow valves, the pressure of the air in chamber 91 will have to be decreased until the force of the spring 108 and the pressure of the air in chamber 91 acting on one side of the diaphragm 89 equals the force of the spring 107 and the pressure of the air in chamber 90 acting on the other side of the diaphragm. Thus to maintain the valve member 101 in modulating position the outflow valve 20 must flow a proportionally greater amount of air than the outflow valve 14, the amount depending upon the setting or adjustment of the spring 108. Conversely if the force of the spring 108 is decreased, the controller 86 will maintain a proportionally smaller flow of air through the valve 20 than through the valve 14.

In the modified form of the invention shown in FIG. 2 the outflow valves 14 and 20 are both located in the enclosure 10 and a modified flow equalizing controller, indicated generally at 110, is provided to maintain equal flows through the outflow valves. However, the outflow valves 20 could be located in a separate compartment in the manner shown in FIG. 1, the two species of the invention differing only in the type of equalizing controller utilized in the system. The outflow valves 14 and 20, the relays 54 and 55, and the pressure control setting mechanism 66 shown in FIG. 2 are identical to similar units shown in FIG. 1 and like numerals in the two drawings indicate like parts.

The flow equalizing controller 110 shown in FIG. 2 has an upper chamber 111, a middle chamber 112, and a lower chamber 113. The upper chamber 111 and the middle chamber 112 are separated by a diaphragm 115 having a pair of reinforcing plates 116 and 117 secured on a central region of the diaphragm. The middle chamber 112 and the lower chamber 113 are similarly separated by a diaphragm 119 having a pair of reinforcing plates 120 and 121 secured on a central region of the diaphragm.

A tube 123 connects the chamber 113 with the throat of a Venturi 124 located within the base 22 of the outflow valve 20. Similarly a tube 126 connects the chamber 111 with the throat of a Venturi 127 located within the base 122 of the outflow valve 14. Thus the pressures in chambers 111 and 113 are the pressures respectively sensed by the tubes 126 and 123, the pressures being a measure of the air flow through the outflow valves 14 and 20. The middle chamber 112 is subjected to enclosure pressure admitted through openings 129.

A metering valve 131 comprising a stem 132 and a head 133 which controls flow of air through conduits 134 and 135 connecting the operating pressure chamber 36 with ambient atmosphere is urged toward a valve seat 136 and into engagement with the reinforcing plate 116 by a spring 137. A similar metering valve 139 comprising a stem 140 and a head 141 which controls flow of air through conduits 142 and 143 connecting the operating pressure chamber 35 with ambient atmosphere, is urged toward a valve seat 144 and into engagement with the reinforcing plate 121 by a spring 145. A member 147 fixedly connects the reinforcing plates 117 and 120.

A spring retainer 150 and an adjusting screw 151 are provided for calibrating the spring 137 to obtain the desired proportional flow through the outflow valves as hereinafter described. A nut 152 retains the screw 151 in adjusted position.

In the form of the invention shown in FIG. 2, a selected reference pressure is established in the control pressure setting mechanism 66 and transmitted through connections 63 to the relay mechanisms 54 and 55 which function to provide the operating pressure for chambers 35 and 36 of the outflow valves 14 and 20 in the manner described above for the form of the invention disclosed in FIG. 1. To illustrate the operation of the controller 110 let it be assumed that the adjusting screw 151 is set to maintain the metering valves 131 and 139 in a modulating position when the flows through the outflow valves are equal. If, with this setting, the flows of air through the outflow valves become unequal, the controller 110 will function to equalize the flows.

For example, if the flow of air through the outflow valve 20 is less than the flow of air of the outflow valve 14, the pressure transmitted through tube 123 to chamber 113 is greater than the pressure transmitted through tube 126 to chamber 111. This differential in pressure acting on the diaphragms 115 and 119 cause the diaphragms to move in the upwardly direction to move the head 133 of the metering valve 131 further off the seat 136 to permit additional air to flow from the chamber 36 through conduits 134 and 135 to ambient atmosphere.

The movement of diaphragms 115 and 119 in the upwardly direction simultaneously moves the head 141 of the metering valve 139 toward the valve seat 144 to restrict flow from chamber 35 through conduits 142 and 143 to ambient atmosphere. Thus the pressure in chamber 36 is decreased and the outflow valve 20 is moved in the opening direction to flow more air while the pressure in chamber 35 is increased and the outflow valve 14 is moved in the closing direction to flow less air. Thus the flows through the outflow valve 14 and 20 are quickly equalized.

When the flow of air through the outflow valve 20 is greater than the flow of air through the outflow valve 14, the differential of pressure acting on the diaphragms 115 and 119 move the diaphragms in the downwardly direction to cause valve 20 to move in the closing direction and valve 14 to move in the opening direction to equalize flow through the valves.

Setting the adjusting screw 151 to increase or decrease the force of the spring 137 above or below the adjustment required to maintain equal flows through the outflow valve will cause the valves to flow unequal amounts of air, as may be desired. For example, if the force of the spring 137 is increased, the head 133 will be moved toward the valve seat 136 and the head 141 will be moved away from the seat 144. Thus the pressure of the air in chamber 36 will increase to move the outflow valve 20 in the closing direction to decrease the flow of air through the valve while the pressure of the air in chamber 35 will decrease the move the outflow valve 14 in the opening direction to increase the flow of air through the valve. When the forces across the diaphragms 115 and 119 are equalized the metering valves 131 and 139 will assume a modulating position. Thus when the force of the spring 137 is increased as noted above the outflow valve 14 will flow a proportionally greater amount of air than outflow valve 20, the percentage of airflow through the valve being determined by the setting of the adjustment screw 151. Conversely, if the force of the spring 137 is decreased flow through the outflow valve 14 will be decreased and flow through the outflow valve 20 will be increased.

While certain preferred embodiments of the invention

I claim:

1. Mechanism for controlling the pressure in an enclosure having a continuous flow of fluid therethrough, including: a plurality of outflow valves for controlling flow of fluid from the enclosure, each of said valves having walls defining a chamber; control pressure setting mechanism connected to said chambers for establishing a preselected operating pressure in each of said chambers; and means including a pressure controller means adapted to modify the operating pressure in the chamber of one of said valves to effect a predetermined proportional flow through said valves, said pressure controller means sensing a pressure differential indicative of the differential between the flow of fluid through one of said plurality of outflow valves and the flow of fluid through another of said plurality of outflow valves.

2. Mechanism for controlling the pressures in an enclosure having a continuous flow of fluid therethrough, and in a compartment connected with the enclosure so as to receive a continuous flow of fluid therefrom, including: a first outflow valve disposed in the enclosure for controlling flow of fluid from the enclosure; a second outflow valve disposed in the compartment for controlling flow of fluid from the compartment; means defining a chamber in each of said valves; control pressure setting mechanism connected to said chambers for establishing a preselected operating pressure in each of said chambers; and means including a pressure controller means adapted to modify the operating pressure in the chamber of said second outflow valve to effect a predetermined proportional flow through said valves, said pressure controller means sensing a pressure differential indicative of the differential between the flow of fluid through said first and said second outflow valves.

3. Mechanism for controlling the pressure in an enclosure having a continuous flow of fluid therethrough, including: a plurality of outflow valves for controlling flow of fluid from the enclosure, each of said valves including including: a first and a second outflow valve for controlled thereby, one side of the pressure responsive elements being subjected over its entire surface to enclosure pressure; means in each of said outflow valves defining a chamber, the opposte side of said pressure responsive elements being subjected to the pressure in said chambers; control pressure setting mechanism connected to said chambers for establishing a preselected operating pressure in each of said chambers; and means actuated in response to a pressure differential indicative of the differential between the flow of fluid through one of said plurality of outflow valves and the flow of fluid through another of said plurality of outflow valves to modify the operating pressure in the chamber of one of the valves to effect a predetermined proportional flow through said valves.

4. Mechanism for controlling the pressure in an enclosure having a continuous flow of fluid therethrough, including: a first and a second outflow valve for controlling flow of fluid from the enclosure, each of said valves including a pressure responsive element and a valve element controlled thereby, one side of the pressure responsive elements being subjected over its entire surface to enclosure pressure; means in each of said outflow valves defining a chamber, the opposite side of said pressure responsive elements being subjected to the pressure in said chambers; control pressure setting mechanism connected to said chambers for establishing a preselected operating pressure in each of said chambers; and means actuated in response to a pressure differential indicative of the differential between the flow of fluid through said first and said second outflow valves to simultaneously increase the pressure in the chamber of one of said valves and decrease the pressure in the chamber of the other of said valves to effect a predetermined proportional flow through said valves.

5. Mechanism for controlling the pressure in an enclosure having a continuous flow of fluid therethrough, including: a plurality of outflow valves for controlling flow of fluid from the enclosure, each of said valves including a pressure responsive element and a valve element controlled thereby, one side of the pressure responsive elements being subjected over its entire surface to enclosure pressure; means in each of said outflow valves defining a chamber, the opposite side of said pressure responsive elements being subjected to the pressure in said chambers; control pressure setting mechanism connected to said chambers for establishing a preselected operating pressure in each of said chambers; and means including a pressure responsive movable wall actuated in response to a pressure differential indicative of the differential between the flow of fluid through one of said plurality of outflow valves and the flow of fluid through another of said plurality of outflow valves to modify the operating pressure in the chamber of one of the valves to effect a predetermined proportional flow through said valves.

6. Mechanism for controlling the pressure in an enclosure having a continuous flow of fluid therethrough, including: a first and a second outflow valve for controlling flow of fluid from the enclosure, each of said valves including a pressure responsive element and a valve element controlled thereby, one side of the pressure responsive elements being subjected over its entire length to enclosure pressure; in each of said outflow valves defining a chamber, the opposite side of said pressure responsive elements being subjected to the pressure in said chambers; control pressure setting mechanism connected to said chambers for establishing a preselected operating pressure in each of said chambers; duct means connecting the chamber of said first outflow valve with a region of lower pressure; valve means for controlling flow in said duct means; and means responsive to a pressure differential indicative of the differential between the flow of fluid through said first and said second outflow valves for actuating said valve means to modify the operating pressure in the chamber of said first outflow valve to effect a predetermined proportional flow through said valves.

7. Mechanism for controlling the pressure in an enclosure having a continuous flow of fluid therethrough, including: a first and a second outflow valve, each of said valves including a chamber, a pressure responsive element subjected on one side to the pressure in said chamber and on the entire surface of the opposite side to enclosure pressure, and a movable valve member controlled by said pressure responsive element; means defining outlets for said first and second outflow valves controlled by said valve members; control pressure setting mechanism connected to said chambers for establishing a preselected operating pressure in each of said chambers; duct means forming a passage for the flow of fluid from the chamber of said first outflow valve; valve means for controlling flow in said duct means; and means adapted to modify the operating pressure in the chamber of said first outflow valve to effect a predetermined proportional flow through the outlets for said outflow valves, said modifying means including a pressure responsive movable wall operatively connected to said valve means and subjected on one side to a pressure indicative of the flow of fluid through the outlet for said first outflow valve and on the opposite side to a pressure indicative of the flow of fluid through the outlet for said second outflow valve.

8. Mechanism for controlling the pressure in an enclosure having a continuous flow of fluid therethrough, including: a first and a second outflow valve, each of said valves including a chamber, a pressure responsive element subjected on one side to the pressure in said chamber and on the entire surface of the opposite side to enclosure pressure, and a movable valve member controlled by said pressure responsive element; means defining outlets for said first and second outflow valves controlled by said valve members; control pressure setting mechanism connected to said chambers for establishing a preselected operating pressure in each of said chambers; first duct means forming a passage for the flow of fluid from the chamber of said first outflow valve; first valve means for controlling flow through said first duct means; second duct means forming a passage for the flow of fluid from the chamber of said second outflow valve; second valve means for controlling flow through said second duct means; and means adapted to simultaneously modify the operating pressure in the chamber of said first outflow valve and the chamber of said second outflow valve to effect a predetermined proportional flow through the outlets for said outflow valves, said modifying means including pressure responsive movable wall elements operatively connected to said first and second valve means and actuated in response to a pressure differential indicative of the differential between the flow of fluid through the outlets for said first and said second outflow valves.

References Cited in the file of this patent

UNITED STATES PATENTS

| | | |
|---|---|---|
| 1,333,986 | Lundgaard | Mar. 16, 1920 |
| 2,407,258 | Del Mar | Sept. 10, 1946 |
| 2,414,202 | Jepson et al. | Jan. 14, 1947 |
| 2,491,270 | Kemper | Dec. 13, 1949 |
| 2,814,241 | Silver | Nov. 26, 1957 |
| 2,905,071 | Krueger | Sept. 22, 1959 |

UNITED STATES PATENT OFFICE
CERTIFICATE OF CORRECTION

Patent No. 3,145,638                                              August 25, 1964

Richard A. Fischer

It is hereby certified that error appears in the above numbered patent requiring correction and that the said Letters Patent should read as corrected below.

Column 3, line 33, for "siutable" read -- suitable --; column 6, line 54, for "valve" read -- valves --; line 62, for "the", first occurrence, read -- to --; column 7, line 44, strike out "including: a first and a second outflow valve for" and insert instead -- a pressure responsive element and a valve element --; column 8, line 30, for "length" read -- surface --; line 31, before "in" insert -- means --.

Signed and sealed this 12th day of January 1965.

(SEAL)
test:

ERNEST W. SWIDER
Attesting Officer

EDWARD J. BRENNER
Commissioner of Patents